United States Patent [19]

Straub

[11] Patent Number: 4,664,422

[45] Date of Patent: May 12, 1987

[54] PIPE COUPLING

[76] Inventor: Immanuel Straub, c/o Straub Federnfabrik, Straubstrasse, 7323 Wangs, Switzerland

[21] Appl. No.: 885,784

[22] Filed: Jul. 15, 1986

[30] Foreign Application Priority Data

Aug. 9, 1985 [CH] Switzerland ............... 3425/85

[51] Int. Cl.$^4$ ............................................. F16L 17/04
[52] U.S. Cl. .................................... 285/112; 285/340; 285/373
[58] Field of Search ................... 285/373, 340, 112

[56] References Cited

U.S. PATENT DOCUMENTS

| | | | |
|---|---|---|---|
| 1,789,379 | 1/1931 | Dillon | 285/373 X |
| 2,147,353 | 2/1939 | Scholtes | 285/340 X |
| 2,202,492 | 5/1940 | Jacocks | 285/340 |
| 2,341,164 | 2/1944 | Shimek | |
| 3,877,733 | 4/1975 | Straub | 285/373 X |

FOREIGN PATENT DOCUMENTS 2731464 7/1977 Fed. Rep. of Germany.
82667 7/1980 Luxembourg.

*Primary Examiner*—Dave W. Arola
*Attorney, Agent, or Firm*—Werner W. Kleeman

[57] ABSTRACT

A pipe coupling comprising a housing which can be clamped about pipe ends which are to be interconnected possesses radially inwardly flexed end flanges. The housing encloses an inwardly open sealing gasket having a substantially C-shaped axial cross-sectional configuration made from an elastomeric material such as synthetic rubber. Both ends of this sealing gasket are supported upon the inner or confronting jacket surface of a respective truncated cone-shaped clamping ring. These clamping rings are supported in the housing at the region of their outer edge or outer region by means of the end flanges. The inner edge or inner region of these clamping rings is structured to mechanically engage or dig into the surface of the pipe ends during clamping of the housing. The inner edge or inner region of the clamping rings possesses a concave profile in order to reduce, on the one hand, the necessary force required during clamping of the housing for digging the inner edge or inner region into the pipe ends and, on the other hand, to clearly limit the depth to which the inner edge or inner region penetrates into the pipe ends.

5 Claims, 8 Drawing Figures

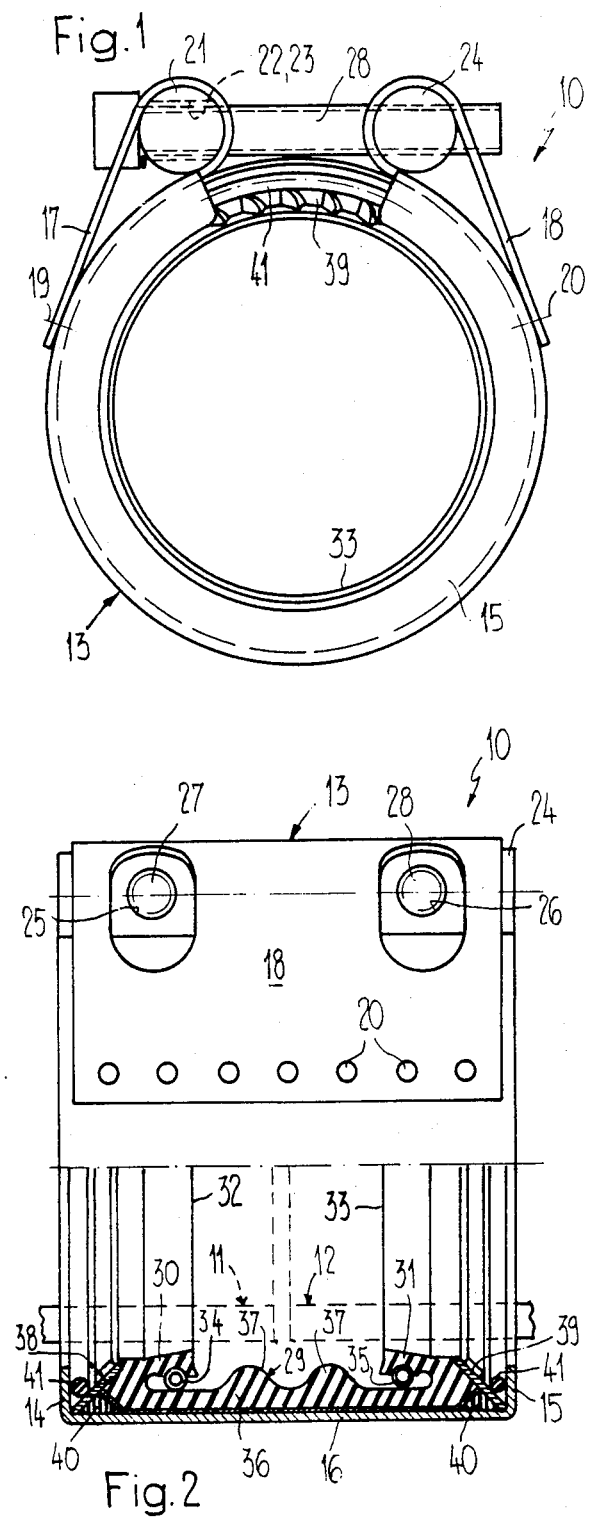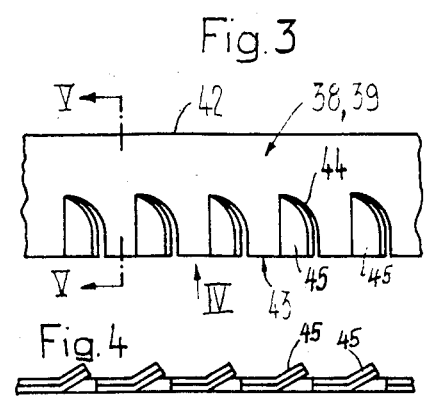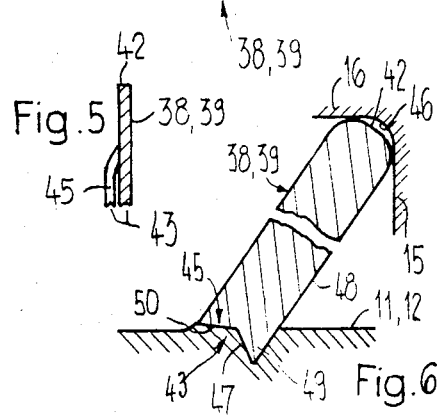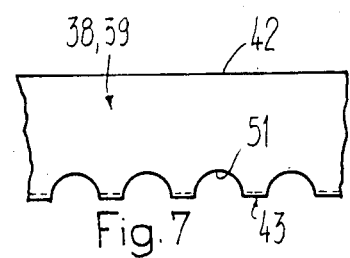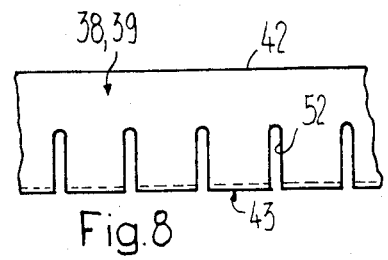

PIPE COUPLING

CROSS REFERENCE TO RELATED APPLICATION AND PATENT

The present application is related to my co-pending U.S. Pat. application Ser. No. 06/864,847 filed May 20, 1986, and entitled "PIPE COUPLING", the disclosure of which is incorporated herein by reference.

This invention is also related to the U.S. Pat. No. 4,119,333, granted Oct. 10, 1978 and entitled "Pipe Coupling".

BACKGROUND OF THE INVENTION

The present invention broadly relates to a pipe coupling comprising a housing which can be clamped about pipe ends which are to be interconnected and which possesses radially inwardly flexed or turned end flanges.

Generally speaking, the pipe coupling is of the type where within the housing there is enclosed an inwardly open sealing gasket possessing a substantially C-shaped axial cross-sectional configuration and made from an elastomeric material such as synthetic rubber. Both ends of this sealing gasket are supported upon the inner or confronting jacket surface of a respective truncated cone-shaped or frusto-conical clamping ring whose diameter can be reduced. Each of the frusto-conical clamping rings is retained at its outer edge or outer region in the axial direction within the housing and is provided with an inner edge or inner region which mechanically engages the periphery of the pipe ends to be interconnected.

A pipe coupling of the aforesaid type is described in the Swiss Pat. No. 620,510, which is substantially cognate with the German Pat. No. 2,731,464, published Mar. 9, 1978 and with the U.S. Pat. No. 4,108,479, granted Aug. 22, 1978. This known pipe coupling has proved itself in practice. The clamping rings are laminated in the region of their smaller or minor diameter by means of straight or J-shaped incisions and the lamellae are somewhat twisted at least at one of their side edges so that the lamellae overlap one another to a certain degree in an imbricated fashion. In such manner the lamellae form claws or teeth on the inner edge or inner region of the clamping rings which dig into the outer surfaces of the pipes to be interconnected during clamping of the housing. These claws or teeth form a substantial snug-fit between the ends of the pipes to be interconnected by means of the housing of the pipe coupling on which the clamping rings are supported.

The ends of the lamellae or teeth for digging into the outer surfaces of the pipes of the known pipe coupling are formed by means of a flat front surface which is practically at right angles to the inner and outer jacket surfaces of the truncated cone-shaped or frusto-conical clamping rings.

It is observed that if the aforesaid known pipe coupling were used to interconnect the ends of pipes made from a comparatively hard material, for example cast iron, a substantial force would be necessary for clamping the housing until the inner edge or inner region of the clamping rings had reliably and sufficiently dug into the outer surfaces around the peripheries of the pipes.

Likewise it is observed that if the aforesaid known pipe coupling were employed to interconnect the ends of pipes made from a comparatively soft material capable of creeping, for example aluminum or copper, the force required for clamping the housing until the inner edge or inner region of the clamping rings had dug into the pipe ends is in fact substantially lower. The depth of penetration of the lamellae or teeth on the inner edge or inner region of the clamping rings, however, remains undetermined or indefinite, so that, especially with very thin-walled pipes, these clamping rings are subject to a possible weakening of their grip into the outer periphery of the pipe ends at the contact line of the inner edge or inner region of the clamping rings.

SUMMARY OF THE INVENTION

Therefore, with the foregoing in mind, it is a primary object of the present invention to provide a new and improved construction of a pipe coupling which does not exhibit the aforesaid drawbacks and shortcomings of the prior art constructions.

Another and more specific object of the present invention aims at providing a new and improved construction of a pipe coupling of the previously mentioned type which necessitates less clamping force, even with pipes constructed of harder materials and/or the depth of penetration of the inner edge or inner region of the clamping rings into the pipe material can be better defined or specified with pipes made from softer material, wherein the risk of a weakening of the walls of thin-walled pipes is substantially avoided.

A further significant object of the present invention aims at providing a new and improved construction of a pipe coupling of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the pipe coupling of the present invention is manifested by the features that the inner edge or inner region of the clamping rings for mechanically engaging with or digging into the outer surface of the pipes to be interconnected possesses a concave profile.

As a result of the concave profile of the inner edge or inner region of the clamping rings, the edge or lip of the inner edge or inner region which first comes into contact with the outer surfaces of the pipes is acute-angled and therefore digs into the pipe material with little expenditure of force, however only until the pipe material displaced by the penetration of the acute-angled edge or lip has filled up the concave profile. This is distinctly or unmistakably noticeable during clamping of the housing.

The concave profile is advantageously V-shaped, wherein this concave profile can possess an aperture or opening angle between 90° and 150°. A lamination or segmentation of the inner edge or inner region of the clamping rings of the aforesaid pipe coupling is not even required for pipes of small nominal or rated diameter. On the other hand, the inner edge or inner region of the clamping rings of the proposed pipe coupling can also be segmented without the necessity of twisting or warping the segments.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 1 is an end view of a pipe coupling ready to be mounted upon the pipe ends which are to be interconnected;

FIG. 2 illustrates in its upper half, a side view of FIG. 1 with the pipe ends introduced into the pipe coupling and shows in its lower half, a longitudinal section of the pipe coupling;

FIG. 3 is a section of a laminated or lamelliform clamping ring shown in developed projection;

FIG. 4 is a view of FIG. 3 looking in the direction of the arrow IV;

FIG. 5 is a section taken substantially along the line V—V of FIG. 3;

FIG. 6 is a schematically simplified section through a clamping ring whose outer edge or outer region is supported on the inner wall of the housing and whose inner edge or inner region has penetrated into the outer surface of a related pipe; and FIGS. 7 and 8 are sections of further preferred embodiments of clamping rings shown similarly in developed projection as in FIG. 3.

DETAILED DESCRIPTION OF THE PREFERRED EMBODIMENTS

Describing now the drawings, it is to be understood that to simplify the showing thereof only enough of the structure of the pipe coupling has been illustrated therein as is needed to enable one skilled in the art to readily understand the underlying principles and concepts of this invention. Turning now specifically to FIGS. 1 and 2 of the drawings, the pipe coupling 10 illustrated therein by way of example and not limitation will be seen to comprise a housing 13 approximately in the shape of a tightening clamp or collar which can be clamped about pipe ends 11 and 12 which are to be interconnected in order to provide a clamping action. These pipe ends 11 and 12 are shown in dash lines in the lower half of FIG. 2. The housing 13 possesses at its ends inwardly directed flanges 14 and 15 (cf. FIG. 2) and between these two end flanges 14 and 15 an essentially cylindrical housing body 16.

As seen in FIG. 1, two flaps 17 and 18 are formed integrally or in one-piece with the longest ends of the housing body 16 and flexed or bent outwardly and away from one another. The free end edges of the flaps 17 and 18 are advantageously welded with the outer jacket or shell surface of the housing body 16 at locations 19 and 20, respectively. The flap 17 encloses a substantially cylindrical clamping rod 21 or equivalent structure and this cylindrical clamping rod 21 possesses two transverse bores 22 and 23 which completely penetrate the clamping rod 21. The flap 18 encloses a further, for instance substantially cylindrical clamping rod 24 or equivalent structure. This clamping rod 24 possesses two internally threaded transverse bores 25 and 26. The clamping rods 21 and 24, which are held by means of the flaps 17 and 18, respectively, are however rotatable and are coupled together by means of two threaded bolts 27 and 28. The head of each of the two threaded bolts 27 and 28 grips directly onto the clamping rod 21 by means of the respective bores 22 and 23. From what has been discussed above it will be apparent that the housing 13 can be contracted or drawn together by tightening the bolts 27 and 28 in the manner of a tightening clamp or collar.

As to the components which are present in the housing 13 between the end flanges 14 and 15 attention is especially directed to the showing of FIG. 2. The housing 13 encloses or surrounds a sealing gasket 29 preferably formed from an elastomeric material, for example a suitable synthetic rubber. This sealing gasket 29 is inwardly open and possesses a substantially C-shaped configuration in its axial cross-section. The inwardly flexed sealing lips 30 and 31 of the sealing gasket 29 terminate in respective sharp sealing edges 32 and 33 and are supported by means of respective helical spring rings 34 and 35 on a web 36 of the sealing gasket 29. The web 36 of the sealing gasket 29 is provided with inwardly projecting beads 37 which serve to stiffen or reinforce the web 36. These beads 37 also prevent the web 36 from lifting away from the inner wall of the housing 13 during continually alternating thermal loading of the sealing gasket 29.

Both end faces of the sealing gasket 29 each rest flatly on the inner or confronting jacket surfaces of respective tapered, in particular truncated cone-shaped or frustoconical clamping rings 38 and 39. The clamping rings 38 and 39 can be contracted or drawn together during the clamping action to mechanically engage or dig into the pipe ends. These clamping rings 38 and 39 are supported, on the one hand, by means of their outer edges or outer regions or peripheries in the fillet or throat 46 defining a transition region between the housing body 16 and, on the other hand, by means of the corresponding end flange 14 or 15 of the housing 13 and here, furthermore, are enclosed by a circlip or snap ring 40 having a triangular cross-section as well as by a circlip or snap ring 41 having a circular cross-section. It can also be seen from FIG. 1 that the clamping rings 38 and 39 are laminated on their inner edge or inner region and that the lamellae are offset from their respective clamping rings.

If the unclamped or non-tightened pipe coupling 10 is now placed upon the pipe ends 11 and 12 which are to be interconnected and thereafter the bolts 27 and 28 tightened, the housing 13 is contracted or drawn together in the manner of a tightening clamp or collar to provide the clamping action. The sealing gasket 29 is thereby drawn together and by virtue of such action is constrainingly similarly displaced inwardly by the contraction or drawing together of its inner diameter. Sealing edges 32 and 33 are thus first sealingly pressed onto the outer circumference of the pipes and, with further tightening of the bolts 27 and 28, the inner edges or inner regions of the clamping rings 38 and 39 also come into contact with the outer surface of the pipes.

Some of the most important characteristics of the pipe coupling 10 according to the invention are described hereinbelow in relation to FIGS. 3 to 6.

FIG. 3 is a developed projection of a section of one of the clamping rings 38, 39. The outer edge or outer region of the clamping rings is indicated by the reference numeral 42 and the inner edge or inner region is indicated by the reference numeral 43. In the inner edge or inner region 43 there are formed J-shaped incisions 44. Lamellae or tabs 45 are formed by these incisions 44 which are somewhat twisted or bent away from the jacket surface of the truncated cone-shaped or frustoconical clamping rings 38, 39. It will be clearly seen from FIG. 5 that the inner edge or inner region 43 of the clamping rings 38, 39 possesses a concave profile, wherein this profile manifests itself in a substantially V-shaped obtuse angle formed between sides or legs 47, 50 thereof. The outer edge or outer region 42 of the clamping rings 38, 39, on the other hand, is rounded.

Referring now to FIG. 6, the method of operation of the clamping rings 38 and 39 having the specific concave or V-shaped profile on their inner edge or inner region 43 will be described hereinbelow. A shortened and simplified cross-section through one of the clamping rings 38, 39 is shown wherein, to simplify the illustration of FIG. 6, the enclosed circlips or snap rings 40 and 41 are not illustrated. The outer rounded periphery at the outer edge or outer region 42 is supported in the throat or fillet 46 defining the transition region between the end flange 15 and the cylindrical housing body 16 of the housing 13. The inner edge or inner region 43 is provided with a substantially V-shaped profile. One leg or side 47 of this concave profile forms an acute-angled cutting or knife edge or knife edge portion 49, together with the outer or non-confronting jacket surface 48 of the truncated cone-shaped clamping rings 38 and 39. This acute-angled cutting edge 49 digs into the material of the pipe ends 11 and 12 during tightening of the threaded bolts 27 and 28. The pipe material is thereby displaced or heaved up. The other leg or side 50 of the V-shaped profile of the inner edge or inner region 43 defines a stop surface portion which forms, on the other hand, a stop pair with the pipe material displaced by means of the acute-angled cutting edge 49 which practically prevents further penetration of the cutting edge 49 into the pipe material. The state which is schematically illustrated in FIG. 6, namely the constriction or clamping of the housing 13 necessary for a satisfactory mechanical connection of the pipe ends 11 and 12, is clearly noticeable during the clamping action produced by tightening of the bolts 27 and 28, since the torque applied for tightening the pipe coupling 10 will suddenly increase as soon as the V-shaped profile is filled with pipe material which has been displaced or heaved up.

The method of operation is similar using the clamping rings 38, 39 according to FIGS. 3 to 5. In these figures that section of the inner edge or inner region 43 first grips or bites into the outer surfaces of the pipe ends 11 and 12 which is associated with the downwardly offset lamellae 45. A further tightening of the bolts 27 and 28 then partially reduces the skew or downward slant of these sections until the sections of the inner edge or inner region 43 which are most downwardly offset also merge with and contact the outer surfaces of the pipe ends 11 and 12 and dig in at that location.

The preferred embodiments of the clamping rings 38 and 39 illustrated in FIGS. 7 and 8 differ from the preferred embodiments illustrated in FIGS. 3 to 5 only in that the inner edge or inner region 43 of the clamping rings 38 and 39 is likewise segmented, however, the individual segments are not "offset" as illustrated the FIGS. 3 to 5. In FIG. 7 the segmentation is achieved by means of arcuate depressions or grooves 51 and in FIG. 8 is realized by means of slots 52. In these embodiments the outer edge or outer region 42 is also rounded and the segmented inner edge or inner region 43 likewise possesses a substantially concave V-shaped profile.

The concave profile of the inner edge or inner region 43 of the clamping rings 38 and 39 does not have to be V-shaped but can also be arcuate or arched in shape. With such an arcuate profile, however, the necessary amount of penetration of the inner edge or inner region 43 into the pipe ends 11 and 12 when tightening the bolts 27 and 28 is less clearly noticeable than with the V-shaped profile.

While there are shown and described present preferred embodiments of the invention, it is to be distinctly understood that the invention is not limited thereto, but may be otherwise variously embodied and practiced within the scope of the following claims. Accordingly,

What I claim is:

1. A pipe coupling for coupling together the pipe ends of pipes having an outer surface and which are to be interconnected, comprising:
    a housing for engaging the pipe ends with a clamping action;
    said housing having two ends, an inner surface and a radially inwardly extending flange at each of said two ends and defining conjointly with said inner surface respective transition regions;
    a sealing gasket of elastomeric material enclosed within said housing and possessing a substantially C-shaped axial cross-sectional configuration;
    said sealing gasket being inwardly open and having end faces and sealing lips extending inwardly therefrom and each defining a sealing surface for engagement with the outer surface of the pipe ends to be interconnected;
    a respective substantially frusto-conical clamping ring associated with each of said end faces and having an inner jacket surface confronting an associated one of said end faces;
    each said substantially frusto-conical clamping ring having an outer edge of a larger diameter and an inner edge of a smaller diameter than said outer edge;
    each said substantially frusto-conical clamping ring being supported at said outer edge thereof at an associated one of said respective transition regions;
    each said substantially frustro-conical clamping ring being structured to mechanically engage at said inner edge an associated one of the pipe ends at its outer surface during said clamping action;
    said inner edge of said respective substantially frusto-conical clamping rings possessing a concave profile; and
    said concave profile defining a knife edge portion and a stop surface portion for limiting the extent of penetration of said knife edge portion into said outer surface of the pipe ends under said clamping action.

2. The pipe coupling as defined in claim 1, wherein: said concave profile is substantially V-shaped.

3. The pipe coupling as defined in claim 2, wherein: said substantially V-shaped concave profile exhibits an aperture angle; and
    said aperture angle amounting to at least 90° and at most 150°.

4. The pipe coupling as defined in claim 1, wherein: said inner edge of said respective substantially frusto-conical clamping rings being segmented.

5. A pipe coupling for coupling together the pipe ends of pipes having an outer surface and which are to be interconnected, comprising:
    a housing for engaging the pipe ends with a clamping action;
    said housing having two ends, an inner surface and an inwardly extending flange at each of said two ends and defining conjointly with said inner surface respective transition regions;

a sealing gasket enclosed within said housing;

said sealing gasket having end faces and sealing lips extending inwardly therefrom and each defining a sealing surface for engagement with the outer surface of the pipe ends to be interconnected;

a respective substantially tapered clamping ring associated with each of said end faces and having an inner jacket surface confronting an associated one of said end faces;

each said substantially tapered clamping ring having an outer region of a larger diameter and an inner region of a smaller diameter than said outer region;

each said substantially tapered clamping ring being supported at said outer region thereof at an associated one of said respective transition regions;

each said substantially tapered clamping ring being structured to mechanically engage at said inner region an associated one of the pipe ends at its outer surface during said clamping action;

said inner region of said respective substantially tapered clamping rings possessing a concave profile; and said concave profile defining a knife edge portion and a stop surface portion for limiting the extent of pentration of said knife edge portion into said outer surface of the pipe ends under said clamping action.

* * * * *